Patented Apr. 10, 1951

2,548,186

UNITED STATES PATENT OFFICE 2,548,186

INTERPOLYMERS OF AN ALKYL ACRYLATE, AN AROMATIC MONOOLEFIN, AND A VINYL ESTER OF AN AROMATIC MONOCARBOXYLIC ACID

Robert J. Wolf, Cleveland, Ohio, assignor to The B. F. Goodrich Company, New York, N. Y., a corporation of New York No Drawing. Application February 25, 1950, Serial No. 146,346

4 Claims. (Cl. 260—80.5)

The present invention relates to new resinous interpolymers obtained by the polymerization of monomeric mixtures containing at least three monomeric components, each in particular proportions, one of which is an alkyl acrylate, another of which is an aromatic olefin such as styrene, and another of which is a vinyl ester of an aromatic monocarboxylic acid, such as vinyl benzoate, which interpolymers possess various new and unique properties, especially in regard to their ability to form strong, flexible, non-tacky films having excellent clarity even when exposed to heat and light, combined with excellent insensitivity to water and the ability to adhere firmly to metallic and other surfaces. The invention pertains particularly to three-component interpolymers or tripolymers of these three types of monomers which have inherent film-forming properties so as not to require addition of plasticizers and which are sufficiently soluble in common organic solvents as to be specially adapted to the production of lacquers, paints and coating compositions.

Copolymers of alkyl acrylates such as methyl and ethyl acrylate with styrene are known resinous materials soluble in certain organic solvents and capable of forming synthetic resin films. Such films, however, do not possess the combination of strength and flexibility with heat resistance which is desired. If the styrene content is high the film is undesirably brittle, whereas if the acrylate content is high the film softens undesirably upon exposure to heat. Moreover such films possess only moderate resistance to water and are often colored particularly after exposure to heat and light. Copolymers of alkyl acrylates with vinyl benzoate possess relatively poor heat and light stability so that films thereof suffer from these disadvantages and also suffer from the disadvantage of being too soft and tacky for more than a few specialized uses.

It is the primary object of this invention, therefore, to provide a new class of synthetic resins possessing improved film-forming properties, improved strength and flexibility, sufficient softness and plasticity as to be not brittle even in the absence of plasticizers, improved heat and light resistance, and insensitivity to water. It is also an object to provide synthetic resins having high solubility in cheap and readily available organic solvents and which in form of solutions, cements, finished lacquers and paints are capable of yielding tack-free films and coatings which are nevertheless tightly adherent to metallic and other surfaces. The attainment of these and still other objects will become apparent in the description of the invention which follows.

I have found that by polymerizing monomeric mixtures containing at least three components, each in definite proportions, one being a lower alkyl ester of acrylic acid such as ethyl acrylate, another an aromatic monoolefin such as styrene, and the third a vinyl ester of an aromatic monocarboxylic acid such as vinyl benzoate, I am able to obtain novel interpolymers having unique properties for achieving the above and other objectives.

The relative proportions of monomers which are employed in the production of my interpolymers are somewhat critical, since the desired properties are not secured in any proportion, but may vary within certain limits. I have found it necessary to employ in the monomeric mixture from 30 to 80% of lower alkyl acrylate, from 10 to 65% of vinyl aromatic ester, and from 5 to 40% of aromatic monoolefin. Other monoolefinic monomeric materials including vinyl chloride, vinylidene chloride, vinyl acetate, diethyl maleate, acrylonitrile, higher alkyl acrylates, furfuryl and tetrahydrofurfuryl acrylates and others, may be added to the monomeric mixture in proportions up to 10 or 20% by weight, if desired, often with even improved results. However, it is generally preferred to utilize only the three-specified types of monomers since the desired properties are thereby secured and preparation of the resin is facilitated by working with the minimum number of monomers. Tripolymers produced from three component monomeric mixtures containing from 35 to 75% of methyl or ethyl acrylate, from 20 to 60% of vinyl benzoate and from 5 to 20% of styrene are the especially preferred resins of this invention.

The lower alkyl acrylates utilizable as one of the principal monomeric components of the mixture are those in which the alkyl group contains from 1 to 4 carbon atoms. Illustrative compounds of this class include methyl acrylate, ethyl acrylate, propyl acrylate, isopropyl acrylate, n-butyl acrylate and isobutyl acrylate. All of the alkyl acrylates of this class form excellent interpolymers of the class of this invention but ethyl acrylate is the most efficient in this respect.

Other esters of acrylic acid which may be utilized in addition to or as a partial replacement for the lower alkyl acrylate include the higher alkyl acrylates in which the alkyl group contains from 5 to 10 carbon atoms. Among these are n-amyl acrylate, n-hexyl acrylate, n-heptyl acrylate, isooctyl acrylate (1-methylheptyl acrylate), n-octyl acrylate, 2-ethylhexyl acrylate, 3,5,5-trimethylhexyl acrylate, n-decyl acrylate and others.

Although the preferred vinyl ester of an aromatic monocarboxylic acid ester is vinyl benzoate other vinyl esters of aromatic acids in which a single carboxyl group is attached directly to a nuclear carbon atom are also utilizable. Among these are the vinyl esters of benzoic acid, chlorobenzoic acid, toluic acid, chloro-toluic acid, naphthoic acid, pyrocatechuic acid and others. Vinyl benzoate, however, by reason of its lower cost and by reason of its forming most desirable interpolymers with an alkyl acrylate and an aromatic monoolefin is greatly preferred.

The preferred aromatic olefin is styrene, but other aromatic olefins in which a single vinyl

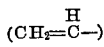

group is attached directly to a nuclear carbon atom are also utilizable. The aromatic olefinic compound may be a hydrocarbon, as styrene, o- and p-methyl styrene, vinyl naphthalene etc., or it may contain substituents in the aromatic nuclei, for example, as in the chloro- and methoxy-substituted styrenes, the chloro- and methoxy-substituted vinyl naphthalenes etc. The polymerization reaction to form new interpolymers may be carried out in any conventional manner though polymerization in an organic solvent for the monomers and for the polymer is, of course, preferred when the interpolymer is to be utilized as a lacquer or coating material. In addition to this preferred method, the mixture of monomers may be polymerized in an aqueous medium in the presence of an emulsifier in which case the end product is a polymeric dispersion or latex (which may be used as such in film-formation or from which the solid interpolymer may be obtained by coagulation) or in the presence of a colloidal protective material such as bentonite clay, gelatin, polyvinyl alcohol, polyacrylic acid, water-soluble phenol- and urea-aldehyde condensation products etc., in which case the interpolymer is obtained as a fine granular precipitate. Interpolymer in the form of a solid malaxated mass is obtained by the polymerization of the monomeric mixture in the absence of any solvent or diluent medium. However produced, the interpolymer will be possessed of the desirable properties set forth in the statement of the objectives of the invention.

Whatever method of polymerization is employed a catalyst is generally required. Any of the catalysts commonly employed for the polymerization of vinyl and vinylidene compounds may be utilized. Actinic radiation may be employed, as well as the various peroxygen compounds such as hydrogen peroxide, benzoyl peroxide, o,o'-dichlorobenzoyl peroxide, caproyl peroxide, caprylyl peroxide, pelargonyl peroxide, cumene hydroperoxide, tertiary butyl hydroperoxide, 1-hydroxycyclohexyl hydroperoxide, tertiary butyl diperphthalate, tertiary butyl perbenzoate, sodium, potassium, and ammonium persulfate, sodium perborate, sodium percarbonate, and others. In the preferred polymerization method, that of polymerization in organic solvent, it is, of course, preferred to utilize an oil or solvent-soluble catalyst such as the organic peroxides.

In the preferred method of solution polymerization a wide variety of organic solvents may be employed. For example, ethyl acetate, teluene, teluene ethyl acetate mixtures, methyl ethyl ketone, methyl ethyl ketone toluene mixtures, acetone, mixtures of toluene and acetone, cyclohexanone, chlorotoluene, cyclopentanone, tetrahydrofurfural and others are excellent solvents, some of them forming solutions of up to 50% total solids with the interpolymers of this invention. In addition, benzene, chlorobenzene, naphthalene, nitrotoluene, nitrobenzene, ethylene dichloride, and other materials in which my interpolymers are not highly soluble may be combined with various proportions of the better solvents to form solutions of lower cost and substantially equivalent properties.

When the polymerization is conducted in aqueous emulsion any of the usual emulsifying agents may be employed. Ordinary soaps such as the alkali metal, ammonium and alkanol-amine salts of fatty acids, including sodium oleate, sodium myristate, potassium palmitate, ammonium stearate, ethanol amine laurate, and the like, as well as rosin or dehydrogenated rosin soaps may be employed as may also synthetic saponaceous materials such as the salts of the alkaryl sulfonic acids, or of acid sulfuric esters of long chain alcohols such as sodium isopropyl naphthalene sulfonate, sodium lauryl sulfate, the salts of sulfonated petroleum fractions and the like.

While the polymerization may be carried out in the presence of air the rate of reaction is ordinarily faster in the absence of oxygen and hence polymerization in an evacuated vessel or under an inert atmosphere is preferred. The temperature at which the polymerization is carried out is not critical, it may be varied widely from $-30°$ to $100°$ C. or higher, though best interpolymers are generally obtained at a temperature of about $0°$ C. to about $70°$ C.

The preparation of the interpolymers of this invention will be more clearly described in the following specific examples which are intended merely as illustrations of the nature of my invention and not as limitations on the scope thereof.

*Example 1*

A tetrapolymer was prepared by polymerization of the monomeric materials contained in a reaction mixture having the following composition:

| Material: | Parts/weight |
|---|---|
| Ethyl acrylate | 50.0 |
| Vinyl benzoate | 20.0 |
| Styrene | 20.0 |
| Vinyl chloride | 10.0 |
| Ethyl acetate | 200.0 |
| O,O'-dichlorobenzoyl peroxide | 1.5 |

The ethyl acetate and O,O'-dichlorobenzoyl peroxide were charged to the reaction vessel and the mixture agitated until the catalyst dissolved. The vessel was then evacuated, flushed with nitrogen and the monomers added. The contents of the vessel were then agitated and warmd to $60°$ C. In 18 hours and 50 minutes at $60°$ C. the reaction had proceeded sufficiently far to produce a clear water-white solution containing 18% total solids. The polymer solution was concentrated to over 50% total solids by evaporation of a part of the solvent without impairing the brushability or flowability of the solution.

The tetrapolymer contained in the solution exhibited excellent resistance to the effects of light and to the effects of heat, properties much desired in a lacquer or a coating material. These properties were determined by a test utilizing the tendency of resins to opaquefy and discolor when exposed to heat and light, in which test a clean glass microscope slide is painted or otherwise coated with polymer solution and the light transmitted through the coating measured before and after exposure in an air oven or under a powerful ultraviolet light in a fadeometer, the ratio of the light transmitted after exposure to that transmitted before, expressed in per cent, being taken as a qualitative indication of light stability or heat stability. By this test the tetrapolymer was found to have a light stability after 4 hours exposure to ultraviolet light of 95% and a heat stability after 24 hours in an air oven at 175° C. of 89.2%. These light and heat stability values are significantly higher than those obtained in the same test from either a 50:50 ethyl acrylate styrene copolymer or a 50:50 ethyl acrylate vinyl benzoate copolymer.

The polymer solution of Example 1 was an excellent lacquer for aluminum, iron and steel, copper and copper-clad surfaces, brass, etc., the lacquer coating being extremely adherent to these metallic surfaces. Aluminum and lead foil when coated with the polymer retained their bright mirror-like metallic appearance and the polymer coating could not be loosened or separated from the foil by repeated flexing or creasing.

Example 2

In the manner of Example 1, a monomeric mixture consisting of 60 parts ethyl acrylate, 30 parts styrene, and 10 parts vinyl benzoate was polymerized in 200 parts of ethyl acetate in 19½ hours to yield a thin, low viscosity, clear, water-white polymer solution containing 21% total solids. The solution was concentrated by removal of solvents to over 50% solids content, the concentrated solution retaining excellent brushability and flowability. A film of the polymer solution possessed a light stability of 97.3% and a heat stability of 95% when tested as in Example 1. In addition, the polymer coated on an aluminum or steel plate or deposited on heavy paper or cardboard was not sensitive to water, the latter property making the polymer solution remarkably well adapted to the coating of the interior surfaces of beer, fruit and vegetable cans.

Example 3

A tripolymer was prepared by the polymerization of the monomeric materials contained in a reaction mixture having the following composition:

| Material: | Parts/weight |
|---|---|
| Ethyl acrylate | 45.0 |
| Styrene | 40.0 |
| Vinyl benzoate | 15.0 |
| Toluene | 200.0 |
| Caproyl peroxide | 2.0 |

After 44⅔ hours at 60° C. a very clear, nearly colorless polymer solution containing 23.2% solids was obtained. The solution was used to deposit a homogeneous coating on steel, which after being dried ½ hour at 170° C., was colorless, tack-free, quite tough and remarkably insensitive to water.

Example 4

In the manner of Example 3, a monomeric mixture consisting of 50% ethyl acrylate, 10% diethyl maleate, 20% styrene and 20% vinyl benzoate polymerized to yield a very clear solution containing 24.1% total solids. A film deposited from the tetrapolymer solution was very adherent to metallic surfaces such as steel, brass, aluminum and lead and in addition was strongly adherent to glass. The polymer film was tough, flexible and non-tacky.

Example 5

A monomeric mixture consisting of 30% ethyl acrylate, 65% vinyl benzoate, and 5% styrene was polymerized in 200 parts/100 of monomers of a 50:50 mixture of ethyl acetate and toluene under the conditions of Example 3 to yield a substantially colorless solution containing 28% solids. A portion of the tripolymer was precipitated from the solution by addition of alcohol, and milled on a two-roll plastic mill without plasticizer to form a clear, tough, flexible sheet. Coatings and films deposited from other portions of the tripolymer solution were strongly adherent to metals including iron, steel, copper, lead, tin and brass and to glass and spun glass fabric.

Examples 6 to 8

Example 3 was repeated using a monomeric mixture consisting of 30 parts methyl acrylate, 30 parts ethyl acrylate, 30 parts vinyl benzoate and 10 parts styrene. A clear substantially colorless solution containing 30% solids was obtained. Films and coatings prepared from this polymer solution were very tough, tack-free, and strongly adherent to steel and aluminum surfaces. Example 3 was again repeated using a monomer mixture consisting of 30 parts ethyl acrylate, 15 parts n-butyl acrylate, 45 parts vinyl benzoate and 10 parts styrene to produce a polymer solution which formed clear and substantially colorless films and coatings which were non-tacky, flexible and strongly adherent to steel, aluminum, tin and lead. A softer but otherwise comparable tetrapolymer film was secured from a polymer solution obtained by repeating Example 3 using a monomeric mixture consisting of 40 parts ethyl acrylate, 20 parts 2-ethylhexyl acrylate, 20 parts vinyl benzoate and 10 parts styrene.

While I have disclosed certain specific embodiments of my invention, it is not intended that the invention be limited to the details thereof, except as defined in the appended claims.

I claim:

1. An interpolymer made by polymerizing a mixture of monomeric materials comprising from 30 to 80% by weight of an alkyl ester of acrylic acid in which the alkyl group contains from 1 to 4 carbon atoms, from 10 to 65% by weight of a vinyl ester of an aromatic acid in which a single carboxyl group is attached directly to an aryl nucleus, and from 5 to 40% by weight of an aromatic monoolefin in which the sole olefinic linkage is present in a vinyl group which is attached directly to a nuclear carbon atom.

2. An interpolymer made by polymerizing in solution a monomeric mixture consisting of 35 to 75% by weight of an alkyl ester of acrylic acid in which the alkyl group contains from 1 to 4 carbon atoms, from 20 to 60% by weight of vinyl benzoate, and from 5 to 20% by weight of styrene.

3. A tripolymer made by polymerizing in solution a monomeric mixture consisting of from 35 to 75% by weight of ethyl acrylate, from 20 to 60% by weight of vinyl benzoate and from 5% to 20% by weight of styrene.

4. A tetrapolymer made by polymerizing in solution a monomeric mixture consisting of about 50% ethyl acrylate, about 20% vinyl benzoate, about 20% styrene and about 10% vinyl chloride.

ROBERT J. WOLF.

No references cited.